United States Patent
Benjebbour et al.

(10) Patent No.: US 11,128,353 B2
(45) Date of Patent: Sep. 21, 2021

(54) RADIO BASE STATION

(71) Applicant: NTT DOCOMO, INC., Tokyo (JP)

(72) Inventors: Anass Benjebbour, Tokyo (JP); Yuuya Saitou, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 53 days.

(21) Appl. No.: 16/608,484

(22) PCT Filed: Apr. 25, 2018

(86) PCT No.: PCT/JP2018/016746
§ 371 (c)(1),
(2) Date: Oct. 25, 2019

(87) PCT Pub. No.: WO2018/199135
PCT Pub. Date: Nov. 1, 2018

(65) Prior Publication Data
US 2021/0111767 A1    Apr. 15, 2021

(30) Foreign Application Priority Data

Apr. 28, 2017 (JP) .............................. JP2017-090483

(51) Int. Cl.
*H04B 7/04* (2017.01)
*H04B 7/0417* (2017.01)
(Continued)

(52) U.S. Cl.
CPC ......... *H04B 7/0417* (2013.01); *H04B 7/0478* (2013.01); *H04W 4/023* (2013.01);
(Continued)

(58) Field of Classification Search
CPC ...... H04B 7/04; H04B 7/0413; H04B 7/0417; H04B 7/0421; H04B 7/0452;
(Continued)

(56) References Cited

U.S. PATENT DOCUMENTS

| 5,909,649 A | * | 6/1999 | Saunders | .............. | H04W 16/28 |
| | | | | | 455/450 |
| 2011/0211550 A1 | * | 9/2011 | Suzuki | ................ | H04W 72/046 |
| | | | | | 370/329 |

(Continued)

FOREIGN PATENT DOCUMENTS

| JP | 2009278194 A | 11/2009 |
| JP | 2013135426 A | 7/2013 |

(Continued)

OTHER PUBLICATIONS

International Search Report issued in International Application No. PCT/JP2018/016746, dated Jul. 17, 2018 (6 pages).

(Continued)

*Primary Examiner* — Siu M Lee
(74) *Attorney, Agent, or Firm* — Osha Bergman Watanabe & Burton LLP

(57) ABSTRACT

A radio base station making it possible to perform efficient scheduling of user terminals by reducing feedback information to be received from the user terminals is provided. A radio base station includes a position-related-information obtaining section configured to obtain position-related information indicating positional relationships among multiple user terminals. In addition, the radio base station includes a scheduler configured to determine user groups of the user terminals to be spatially multiplexed in the same time and frequency resources based on the position-related information obtained by the position-related-information obtaining section.

10 Claims, 13 Drawing Sheets

(51) Int. Cl.
*H04B 7/0456* (2017.01)
*H04W 4/02* (2018.01)
*H04W 16/28* (2009.01)
*H04W 64/00* (2009.01)
*H04W 72/12* (2009.01)
*H04B 7/0452* (2017.01)

(52) U.S. Cl.
CPC ......... *H04W 16/28* (2013.01); *H04W 64/006* (2013.01); *H04W 72/121* (2013.01); *H04B 7/0452* (2013.01)

(58) Field of Classification Search
CPC ...... H04B 7/0456; H04B 7/0478; H04B 7/06; H04B 7/0619; H04B 7/0621; H04W 4/02; H04W 4/023; H04W 4/06; H04W 4/08; H04W 16/28; H04W 64/006; H04W 72/12; H04W 72/1205; H04W 72/121
See application file for complete search history.

(56) References Cited

U.S. PATENT DOCUMENTS

2018/0103456 A1* 4/2018 Zhao ............... H04W 72/04
2018/0115447 A1   4/2018 Hasegawa et al.
2018/0310296 A1* 10/2018 Zhao ............... H04W 4/027

FOREIGN PATENT DOCUMENTS

JP    2016136708 A    7/2016
WO    2017026009 A1   2/2017

OTHER PUBLICATIONS

Written Opinion issued in International Application No. PCT/JP2018/016746; dated Jul. 17, 2018 (4 pages).

* cited by examiner

RADIO BASE STATION

TECHNICAL FIELD

The present invention relates to a radio base station.

BACKGROUND ART

Long Term Evolution (LTE) has been specified for achieving a higher data rate, lower latency, and the like in a Universal Mobile Telecommunications System (UMTS) network. Successor systems of LTE have also been studied for achieving a broader bandwidth and a higher speed based on LTE. Examples of successor systems of LTE include the systems called LTE-Advanced (LTE-A), Future Radio Access (FRA), 5th generation mobile communication system (5G), 5G plus (5G+), New Radio Access Technology (New-RAT)), and the like.

In a future radio communication system (for example, 5G), beamforming (BF) by the use of Massive MIMO (Multiple Input Multiple Output) techniques using a large number of antenna elements (for example, 100 elements or more) in a high frequency band (for example, 5 GHz or higher) has been studied to further increase the speed and reduce the interference in signal transmission.

For example, in order to achieve a higher signal transmission rate, a radio base station (hereinafter simply referred to as "base station") performs scheduling of multiple user terminals using multiplexing methods including a method for forming beams based on channel information provided as feedback from the user terminals, so as to spatially multiplex signals to be transmitted to the multiple user terminals (for example, Patent Literature (hereinafter, referred to as "PTL") 1).

CITATION LIST

Patent Literature

PTL1
Japanese Patent Application Laid-Open No. 2016-136708

SUMMARY OF INVENTION

Technical Problem

However, there is a problem that the processing load of scheduling is caused to increase when the number of user terminals increases, since the channel information includes a large amount of information.

In one aspect of the present invention, a radio base station making it possible to perform efficient scheduling of user terminals by reducing feedback information to be received from the user terminals is provided.

Solution to Problem

A radio base station according to one aspect of the present invention includes: an obtaining section configured to obtain position-related information indicating a positional relationship among a plurality of user terminals; and a scheduler configured to determine a user group of some or all of the plurality of user terminals to be spatially multiplexed in the same time and frequency resource based on the position-related information.

Advantageous Effects of Invention

According to one aspect of the present invention, it is possible to perform efficient scheduling of user terminals by reducing feedback information from the user terminals.

DESCRIPTION OF EMBODIMENTS

The present invention relates to a base station and, more particularly, to scheduling for multiplexing signals such as data signals of multiple user terminals.

In 5G, it is expected to utilize high frequency bands to better exploit wider-bandwidth frequency resources, and also expected to achieve a user throughput of 10 Gbps or more, which exceeds the user throughputs of conventional mobile communication systems, by BF and spatial multiplexing using Massive MIMO techniques.

In environments in which 5G is used (e.g. an environment in which the user terminal density is comparatively high), it is expected to increase the system capacity by spatially multiplexing signals for multiple user terminals to communicate with the multiple user terminals simultaneously.

However, in spatial multiplexing using Massive MIMO techniques, since feedback of channel information including a large channel matrix is required for spatially multiplexing the signals for the multiple user terminals, feedback information from the user terminals is caused to increase.

Meanwhile, in 5G in which high frequency bands are utilized, the effect of frequency selective fading is mitigated since the angular spread of beams is made narrower because of the straightness of radio waves and additionally by BF using Massive MIMO techniques. For this reason, spatial multiplexing can be carried out based on the positions or position-related information of the user terminals instead of the channel information including the large channel matrix.

Then, the inventors of the present invention studied a spatial multiplexing method based on the position-related information, and arrived at the present invention.

Hereinafter, embodiments of the present invention will be described with reference to the accompanying drawings.

Embodiment 1

<Configuration of Base Station>

Figure 1:
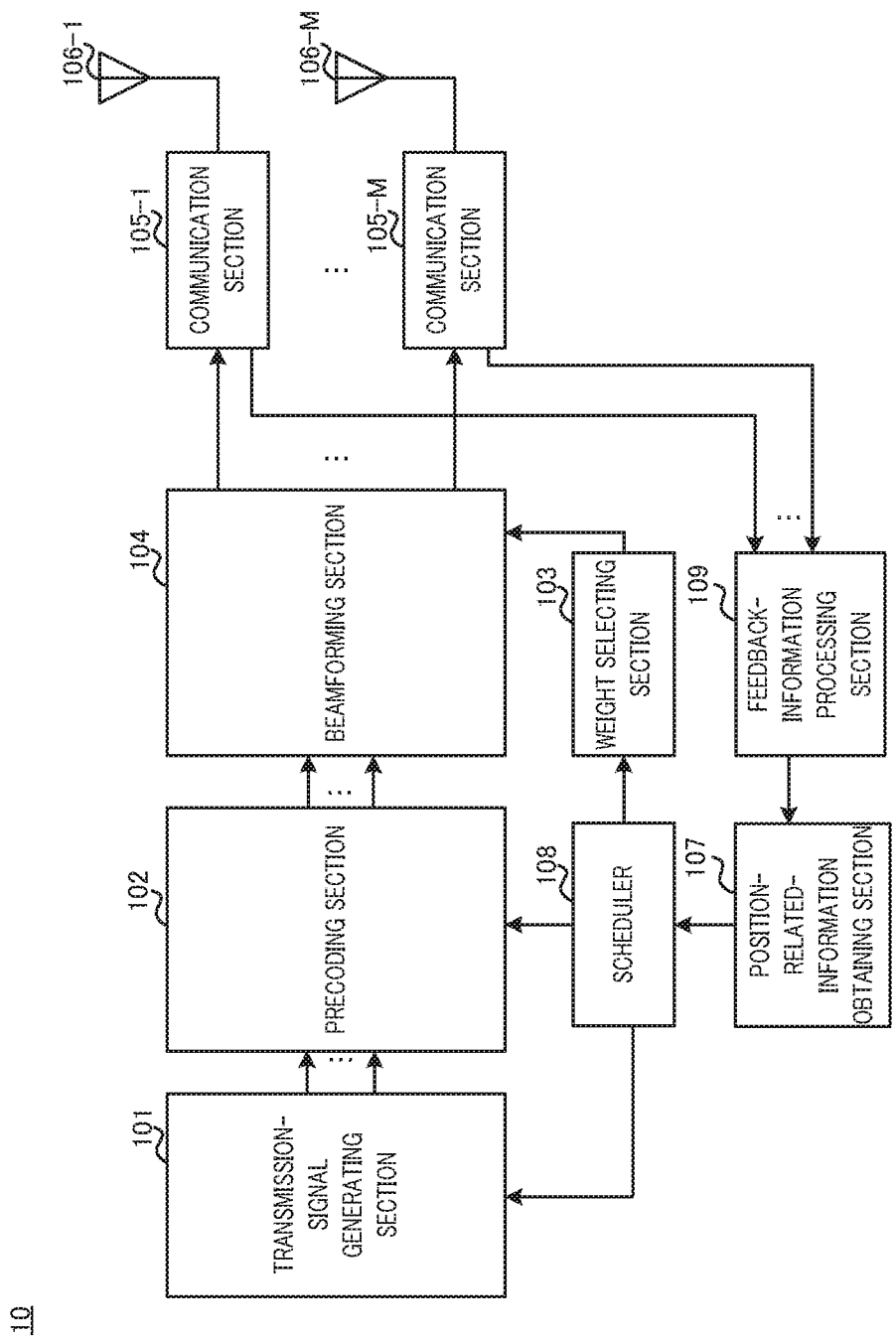
FIG. 1 is a block diagram illustrating an exemplary configuration of a base station according to Embodiment 1.

FIG. 1 is a block diagram illustrating an exemplary configuration of base station 10 according to Embodiment 1 of the present invention. For example, base station 10 is a Massive MIMO base station and communicates simultaneously with multiple user terminals (hereinafter simply referred to as "terminals") using multiuser MIMO techniques. Base station 10 illustrated in FIG. 1 is configured to include transmission-signal generating section 101, precoding section 102, weight selecting section 103, beamforming section 104, communication sections 105, antennas 106, position-related-information obtaining section 107, scheduler 108, and feedback-information processing section 109. Base station 10 illustrated in FIG. 1 multiplexes and transmits signals to multiple terminals 20. The configuration of terminal 20 will be described below.

Note that the illustration of component sections for transmission/reception of Orthogonal Frequency Division Multiplexing (OFDM) signals (e.g., an Inverse Fast Fourier Transform (IFFT) processing section, Cyclic Prefix (CP) adding section, and the like) in base station 10 is omitted in FIG. 1.

Transmission-signal generating section 101 generates signals to be transmitted to multiple terminals 20, and maps the signals to be transmitted to terminals 20 to resources divided in the domains of time and frequency (hereinafter referred to as "time-frequency resources") based on the information on the resource assignment determined by below-described scheduler 108.

Precoding section 102 multiplies the signals output by transmission-signal generating section 101 by a precoding matrix to be output by scheduler 108 so as to generate precoded signals. Precoding section 102 outputs the generated signals to beamforming section 104.

Note that, precoding section 102 does not have to perform precoding when scheduler 108 does not output any precoding matrix. Note also that, although Block Diagonalization (BD) may be used as precoding processing for user separation and for avoiding interfering, for example, the present invention does not have to be particularly limited thereto.

Weight selecting section 103 selects BF weights for forming transmitting beams to terminals 20 based on information on the transmitting beams determined by scheduler 108, and outputs the BF weights to beamforming section 104.

Beamforming section 104 multiplies the signals output by precoding section 102, by the BF weights output by weight selecting section 103. Beamforming section 104 outputs the signals multiplied by the BF weights to communication sections 105.

Communication sections 105-1 to 105-M are provided to correspond to M antennas 106 (antenna elements), respectively. Communication sections 105 perform transmission processing, such as D/A conversion, upconversion, and the like on the signals output by beamforming section 104, so as to generate radio-frequency transmission signals. Communication sections 105 transmit the generated radio-frequency transmission signals to terminals 20 from M antennas 106, respectively. Additionally, communication sections 105 perform reception processing, such as A/D conversion, downconversion, and the like on signals including feedback information to be received via antennas 106, and outputs the signals including the feedback information after the reception processing, to below-described feedback-information processing section 109.

Position-related-information obtaining section 107 obtains position-related information included in the feedback information from terminals 20. Position-related-information obtaining section 107 outputs the obtained position-related information to scheduler 108.

The position-related information is information related to the position of each of terminals 20 and is, for example, at least one of information indicating the distance between each two of terminals 20 (distance information), information indicating the direction in which each of terminals 20 exists relative to base station 10 (direction information), and information indicating the position of each of terminals 20 (position information).

Scheduler 108 performs scheduling of multiple terminals 20 based on the position-related information. For example, scheduler 108 determines groups of terminals for which the signals are spatially multiplexed (user groups).

Then, scheduler 108 assigns time-frequency resources to terminals 20. Specifically, scheduler 108 assigns the same time-frequency resource to those of terminals 20 belonging to the same user group, and assigns another time-frequency resource different in at least one of the time and frequency domains to those of terminals 20 belonging to a different user group. Scheduler 108 outputs the information on the resource assignment to transmission-signal generating section 101.

Additionally, scheduler 108 instructs transmission-signal generating section 101 to transmit uplink transmission permission (uplink grant) including the resource assignment information to those of terminals 20 included in the same user group (i.e. terminals 20 for which signals are spatially multiplexed).

Then, scheduler 108 determines a precoding matrix or transmitting beam for each of terminals 20 in order to spatially multiplex the signals to be transmitted to those of terminals 20 belonging to the same user group. Scheduler 108 outputs the information on the determined precoding matrices to precoding section 102, and outputs the information on the transmitting beams to weight selecting section 103.

Note that, a concrete example of the scheduling by scheduler 108 will be described below.

Feedback-information processing section 109 extracts the feedback information from the signals being obtained from communication sections 105 and including the feedback information, and outputs the feedback information to position-related-information obtaining section 107.

<Configuration of Terminal>

Figure 2:
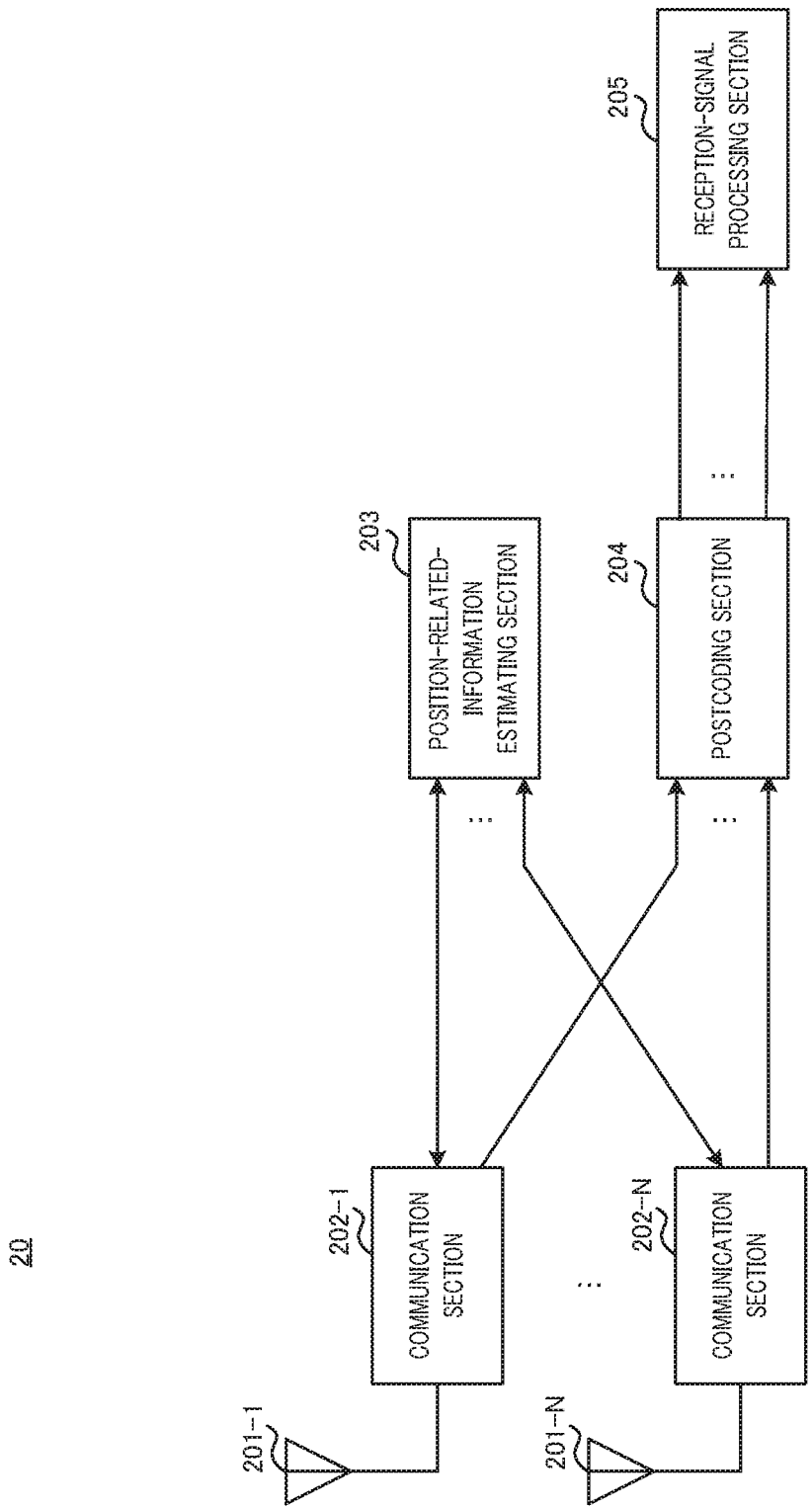
FIG. 2 is a block diagram illustrating an exemplary configuration of a terminal according to Embodiment 1.

FIG. 2 is a block diagram illustrating an exemplary configuration of terminals 20 according to Embodiment 1 of the present invention. Terminal 20 illustrated in FIG. 2 is configured to include antennas 201, communication sections 202, position-related-information estimating section 203, postcoding section 204, and reception-signal processing section 205.

Note that, the illustration of component sections for transmission/reception of OFDM signals (e.g., CP removal section, FFT processing section) and the like in terminal 20 is omitted in FIG. 2.

Communication sections 202-1 to 202-N are provided to correspond to N antennas (N is an integer equal to or greater than two) 201, respectively. Communication sections 202 perform reception processing such as downconversion, A/D conversion, and the like on reception signals received via antennas 201. Communication sections 202 output signals obtained by performing the reception processing to postcoding section 204. Additionally, communication sections 202 perform transmission processing, such as upconversion, D/A conversion, and the like on signals including feedback information to be output by below-described position-related-information estimating section 203, and transmit the signals including the feedback information via antennas 201.

Position-related-information estimating section 203 estimates position-related information related to the position of terminal 20 to which this position-related-information estimating section 203 belongs (hereinafter, this terminal 20 may also be referred to as "first terminal 20") using the signals output by communication sections 202. The signals used for estimation of the position-related information may, for example, be a downlink signal (e.g., at least one of a discovery signal, reference signal, and beacon) transmitted by base station 10, an uplink signal (e.g., a reference signal or beacon) transmitted by another terminal 20 to base station 10, or a signal transmitted by another terminal 20 to first terminal 20.

For example, position-related-information estimating section 203 estimates at least one of the distance between first terminal 20 to another terminal 20, the direction in which first terminal 20 exists relative to base station 10, and the position of first terminal 20.

Examples of methods for estimating distances include a method using a Received Signal Strength Indicator (RSSI), Time Of Arrival (ToA), Time Differential of Arrival (TDoA), and/or Observed Time Differential of Arrival (OT-DOA).

Examples of methods for estimating directions include Angle of Arrival (AoA). Alternatively, when base station 10 uses multiple beams to transmit discovery signals, position-related-information estimating section 203 may estimate, as best beam, one beam for which the reception quality is the highest among the beams used for transmission of the discovery signals. Additionally, the direction to be estimated may include a horizontal angle (azimuth angle) and a vertical angle (elevation angle).

Additionally or alternatively, a signal received by a global positioning system (GPS) reception section (not illustrated) from a GPS Satellite may also, for example, be used in the position estimation method. Alternatively, the distances between first terminal and other devices whose positions are known (for example, multiple terminals 20 and/or base station 10) may be estimated, and the position of first terminal 20 may then be estimated based on the estimated distances and the known positions of the other devices.

Position-related-information estimating section 203 provides base station 10 with the estimated position-related information as feedback information. At this time, position-related-information estimating section 203 may determine the number of layers using a layer table that is based on the received SNR of the signal, and may include the determined number of layers in the feedback information. Alternatively, position-related-information estimating section 203 may include, in the feedback information, information indicating the best beam (the beam index or the like) and/or the reception quality (for example, Channel Quality Indicator (CQI)) corresponding to the best beam. Note that, a method for providing feedback is not particularly limited. Position-related-information estimating section 203 may transmit the signal including the feedback information to base station 10 via communication sections 202, or may provide the feedback using other signaling (higher-layer signaling or the like).

Additionally or alternatively, position-related-information estimating section 203 of first terminal 20 may receive from neighboring terminals 20 around first terminal 20 via communication sections 202, notification of position-related information estimated by said neighboring terminals 20, and may provide base station 10 via communication sections 202 with the feedback information including the position-related information estimated by first terminal 20 and the position-related information of which first terminal 20 has been notified by said neighboring terminals 20.

Additionally or alternatively, position-related-information estimating section 203 may notify one of neighboring terminals 20 around first terminal 20 of the estimated position-related information via communication sections 202 instead of providing base station 10 with the estimated position-related information as feedback. In this case, position-related-information estimating section 203 of said neighboring terminal 20 having received the notification provides base station 10 via communication sections 202 of said neighboring terminal 20 with feedback information including the position-related information estimated by said neighboring terminal 20 and the position-related information of which said neighboring terminal 20 has been notified.

Alternatively, position-related-information estimating section 203 of first terminal may estimate the distances (relative distances) between each two of neighboring terminals 20 existing around first terminal 20 in addition to (or, instead of) the distances between first terminal 20 and neighboring terminals 20. For example, position-related-information estimating section 203 may provide base station 10 with the information on the relative distances as feedback information via communication sections 202 or may notify one of neighboring terminals 20 of such information. When base station 10 is to be provided with the feedback, position-related-information estimating section 203 of first terminal 20 may provide base station 10 with the feedback information including the position-related information estimated by first terminal 20, the position-related information of which first terminal 20 has been notified by said neighboring terminals 20, and the information on the relative distances estimated by first terminal 20.

Postcoding section 204 performs postcoding on the signals output by communication sections 202 using a postcoding matrix, and outputs the postcoded signals to reception-signal processing section 205. Note that, postcoding section 204 does not have to perform postcoding, for example, when the received signals are not precoded.

Reception-signal processing section 205 performs demodulation processing and decoding processing on the signals output by postcoding section 204.

<Concrete Example of Scheduling>

Next, a concrete example of scheduling by scheduler 108 of base station 10 according to Embodiment 1 of the present invention is described. Scheduler 108 determines the user groups of user terminals for which signals are spatially multiplexed, and assigns time-frequency resources respectively corresponding to the determined groups.

Example 1

Figure 3:
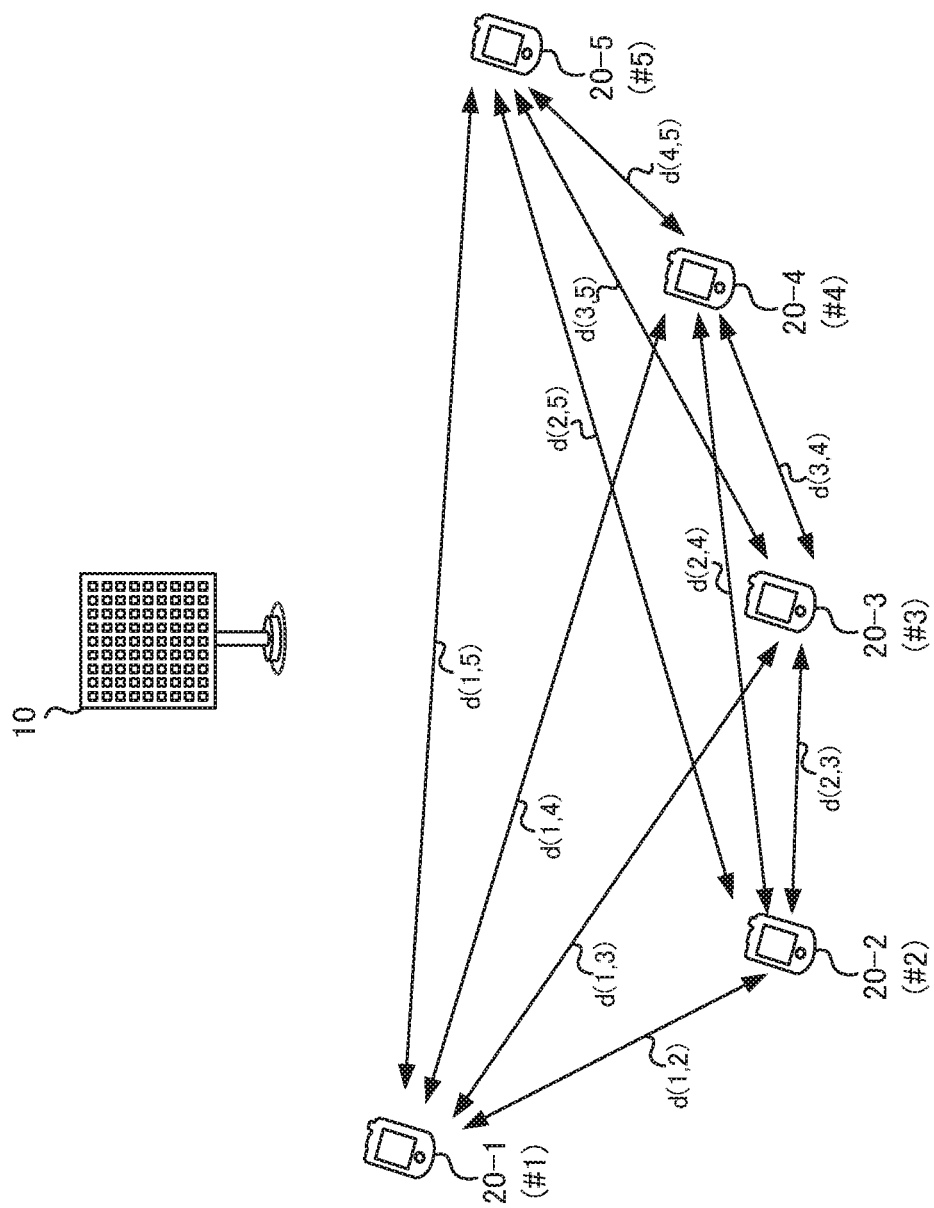
FIG. 3 illustrates Example 1 of a method for determining user groups.

FIG. 3 illustrates Example 1 of a method for determining the user groups. FIG. 3 illustrates the determining method in a case where scheduler 108 obtains the distance information from position-related-information obtaining section 107.

FIG. 3 illustrates base station 10 and five terminals 20 (terminals 20-1 to 20-5). Note that, terminals 20-1 to 20-5 are hereinafter appropriately referred to as terminals #1 to #5.

FIG. 3 shows distance d (1, 2) between terminal #1 and terminal #2. Similarly, FIG. 3 shows distance d (i, j) between terminal #i and terminal #j, where i and j are an integer between 1 and 5, inclusive, and are different from each other.

The distances illustrated in FIG. 3, serving as position-related information, are provided as feedback by a terminal. The terminal providing the position-related information as feedback is not particularly limited. For example, distance d (i, j) between terminal #i and terminal #j may be provided as feedback by at least one of terminal #i and terminal #j, or may be provided as feedback by terminal #k, where k is an integer between 1 and 5, inclusive, and is different from i and j.

Alternatively, terminal #i may notify terminal #k of estimated distance d (i, j). In this case, terminal #k provides base station 10 collectively with the feedback of the distance information (for example, distance d (k, j)) estimated by terminal #k and the distance information (for example, distance d (i, j)) of which terminal #k has been notified. Note, in this case, that terminal #k may receive notification of multiple pieces of distance information from two or more terminals (for example, from terminal #i and terminal #j), and may provide base station 10 collectively with the feedback of the distance information estimated by terminal #k and the multiple pieces of distance information of which terminal #k has been notified.

Alternatively, terminal #i may estimate distance d (j, k) between terminal #j and terminal #k as the relative distance. In this case, terminal #i may provide base station 10 with the information on distance d (j, k) as feedback, or may notify another terminal (for example, terminal #j) of such information. Terminal i, when providing base station 10 with the information on distance d (j, k) as feedback, may provide base station 10 collectively with the information on distance d (j, k) and other distance information (for example, the distance information estimated by terminal #i and/or one or more pieces of distance information of which terminal #i has been notified) as feedback.

When the position-related information is distance information, scheduler 108 determines that terminals 20 for which the distances between one terminal and another are each equal to or greater than a threshold are terminals 20 belonging to the same user group. The threshold with which the distances between terminals are compared is set, for example, based on the distance allowing the orthogonality of the beams formed by base station 10 to be ensured.

By way of example, a method for determining whether or not other terminals (terminals #2 to #5) belong to the same user group as terminal #1 (hereinafter referred to as "user group A") is described with reference to FIG. 3.

Scheduler 108 compares distance d (1, 2) between terminal #1 and terminal #2 with the threshold. In the example of FIG. 3, distance d (1, 2) is less than the threshold and, accordingly, scheduler 108 determines that terminal #2 does not belong to user group A.

Next, scheduler 108 compares distance d (1, 3) between terminal #1 and terminal #3 with the threshold. In the example of FIG. 3, distance d (1, 3) is equal to or greater than the threshold and, accordingly, scheduler 108 determines that terminal #3 belongs to user group A.

Next, scheduler 108 determines whether or not terminal #4 belongs to user group A.

In this case, since scheduler 108 has already determined that terminals #1 and #3 belong to user group A, scheduler 108 compares distance d (1, 4) between terminal #1 and terminal #4 with the threshold and compares distance d (3, 4) between terminal #3 and terminal #4 with the threshold. In the example of FIG. 3, although distance d (1, 4) between terminal #1 and terminal #4 is equal to or greater than the threshold, distance d (3, 4) between terminal #3 and terminal #4 is less than the threshold. In this case, scheduler 108 determines that terminal #4 does not belong to user group A.

Next, scheduler 108 determines whether or not terminal #5 belongs to user group A.

Since scheduler 108 has already determined that terminals #1 and #3 belong to user group A as with the case of terminal #4, scheduler 108 compares distance d (1, 5) between terminal #1 and terminal #5 with the threshold and compares distance d (3, 5) between terminal #3 and terminal #5 with the threshold. In the example of FIG. 3, distance d (1, 5) between terminal #1 and terminal #5 is equal to or greater than the threshold, and distance d (3, 5) between terminal #3 and terminal #5 is equal to or greater than the threshold. In this case, scheduler 108 determines that terminal #5 belongs to user group A.

Similarly, scheduler 108 determines that terminals #2 and #4 are of the same user group (hereinafter referred to as "user group B").

As described above, when the position-related information is distance information, scheduler 108 determines that terminals 20 for which the distances between one terminal and another are each equal to or greater than a threshold are terminals 20 belonging to the same user group.

Note that, although the above description is given in relation to the example where five terminals are divided into two user groups, the number of user groups and the number of terminals included in each user group are not limited. For example, scheduler 108 may change the user groups based on the number of terminals which can be included in one user group (for example, the number of signals that can be spatially multiplexed), the size of time-frequency resources which can be assigned, and/or the like. For example, when the number of terminals which can be included in each user group is two and the time-frequency resources can be assigned to three user groups, scheduler 108 may group terminals #1 and #4 into one user group, terminals #2 and #5 into another user group, and terminal #3 into still another user group.

Note also that, although the descriptions with reference to FIG. 3 are given in relation to terminals 20 existing in a plane, the user groups may be determined based on position-related information indicating three-dimensional positional relationships including the height direction with respect to the plane.

For example, when base station 10 forms beams both in the horizontal direction (for example, the azimuth-angle directions of the beams) and in the vertical direction (for example, the elevation-angle directions of the beams), that is, when beams are formed and scanned not only in one direction but in two mutually-perpendicular directions, the user groups may be determined based on distances along each of the two directions.

For example, when the distance between terminal #1 and terminal #3 in the horizontal direction is equal to or greater than X (X is a positive real number) or the distance between terminal #1 and terminal #3 in the vertical direction is equal to or greater than Y (Y is a positive real number), terminals #1 and #3 may be determined to be terminals belonging to the same user group.

In this case, X and Y may be different from each other. For example, the value of X is set based on the distance allowing the orthogonality of the beams formed by base station 10 in the horizontal directions to be ensured, and the value of Y is set based on the distance allowing the orthogonality of the beams formed by base station 10 in the vertical directions to be ensured.

Next, scheduler 108 assigns time-frequency resources to terminals 20 grouped into the determined user groups.

Figure 4:
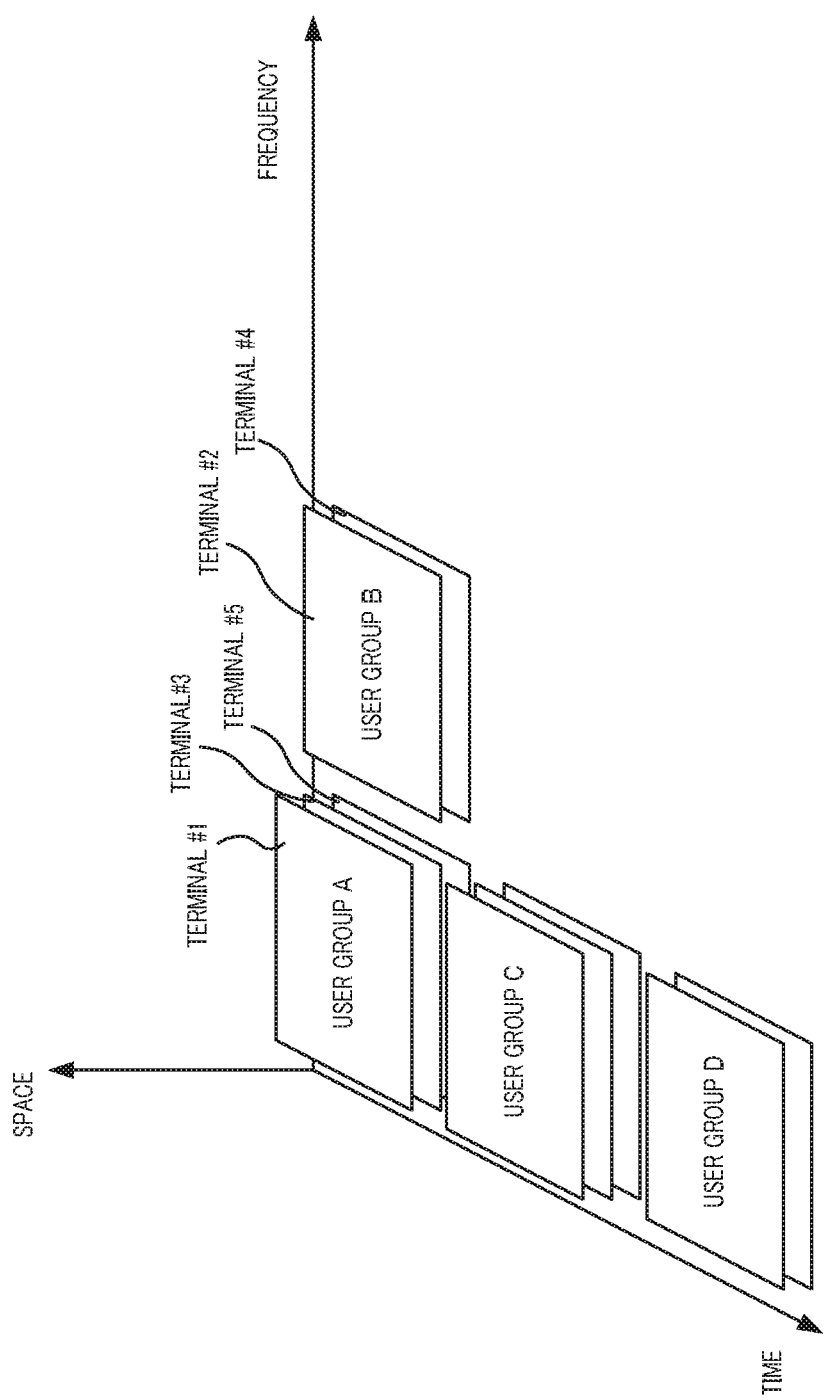
FIG. 4 illustrates an example of resource assignment to terminals grouped into the user groups.

FIG. 4 illustrates an example of resource assignment to terminals 20 grouped into the user groups. FIG. 4 illustrates resource allocation for multiple user groups including user groups A and B with respect to the frequency, time, and space axes.

As illustrated in FIG. 4, terminals #1, #3, and #5 belonging to user group A are spatially multiplexed in the same time-frequency resource. Terminals #2 and #4 belonging to user group B are spatially multiplexed in the resource different from that of user group A in the frequency domain.

Scheduler 108 assigns the same time-frequency resource to the terminals belonging to user group A. Scheduler 108 assigns to the terminals belonging to user group B, the time-frequency resource different from the time-frequency resource assigned to the terminals belonging to user group A in one of the time and frequency domains (in the example of FIG. 4, in the frequency domain). Then, base station 10 spatially multiplexes the signals to be transmitted to the terminals belonging to user group A in the time-frequency resource assigned to user group A, and spatially multiplexes the signals to be transmitted to the terminals belonging to user group B in the time-frequency resource assigned to user group B.

<Processing by Base Station in Example 1>

Figure 5:
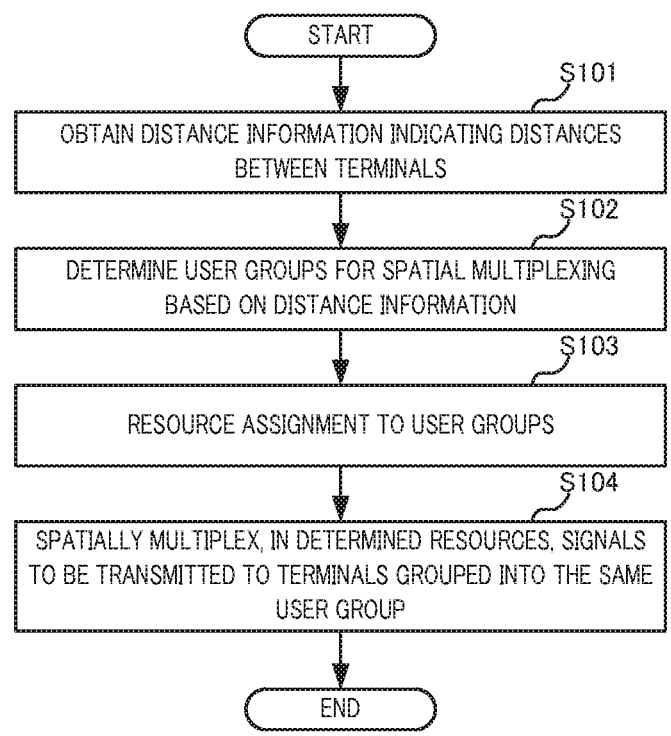
FIG. 5 is a flowchart illustrating Example 1 of processing performed by the base station in Embodiment 1.

Next, Example 1 of processing by base station 10 in Embodiment 1 of the present invention is described with reference to FIG. 5. FIG. 5 is a flowchart illustrating Example 1 of the processing performed by base station 10 in Embodiment 1 of the present invention.

At step S101, base station 10 obtains from terminals 20, the distance information indicating the distances between the terminals as the position-related information.

At step S102, base station 10 determines the user groups for spatial multiplexing based on the distance information.

At step S103, base station 10 assigns time-frequency resources to the determined user groups. Specifically, base station 10 assigns the same time-frequency resources respectively to the same user groups of terminals 20, and assigns time-frequency resources mutually different in at least one of the time and frequency domains respectively to mutually-different user groups of terminals 20.

At step S104, base station 10 spatially multiplexes in the determined time-frequency resources, the signals to be transmitted to the same user groups of terminals 20, and carries out the transmission processing of the signals. Then, the flow ends.

<Variation of Example 1>

Example 1 has been hereinabove described in relation to the case where base station determines that terminals 20 for which the distances between one terminal and another are each equal to or greater than the threshold are terminals 20 belonging to the same user group; assigns time-frequency resources to the determined user groups; spatially multiplexes in the time-frequency resources, signals to be transmitted to the same user groups of terminals 20; and carries out the transmission processing of the signals. However, the present invention is not limited to this example. In order to increase the performance (separation performance) of separating the spatially multiplexed signals at the side of terminals 20, base station 10 may request channel information from terminals 20 belonging to the same user group and may perform scheduling based on the channel information.

Figure 6:
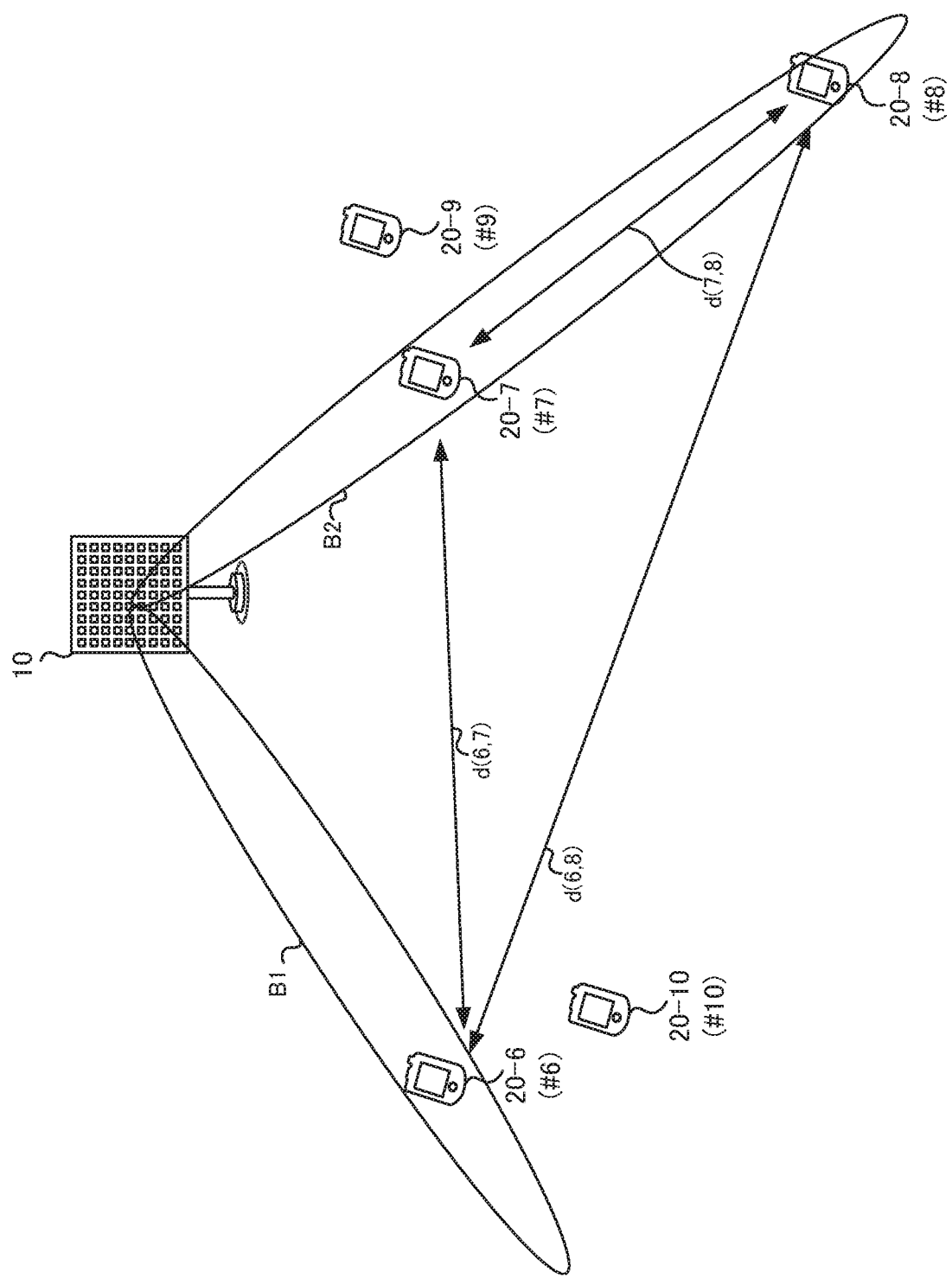
FIG. 6 is an explanatory view for explaining a variation of Example 1 according to Embodiment 1.

FIG. 6 is an explanatory view for explaining a variation of Example 1 according to Embodiment 1 of the present invention. FIG. 6 illustrates base station 10 and five terminals 20 (terminals 20-6 to 20-10). Note that, terminals 20-6 to 20-10 are hereinafter appropriately referred to as terminals #6 to #10.

FIG. 6 shows distance d (6, 7) between terminal #6 and terminal #7, distance d (6, 8) between terminal #6 and terminal #8, and distance d (7, 8) between terminal #7 and terminal #8. Note that, illustration of distances between other terminals (for example, terminals #9 and #10) is omitted for convenience of illustration.

For example, in the example of FIG. 6, base station 10 (scheduler 108) determines that terminal #6, terminal #7, and terminal #8 belong to one user group when distance d (6, 7), distance d (6, 8), and distance d (7, 8) are equal to or greater than a threshold.

In the case illustrated in FIG. 6, because the angular difference between terminal #7 and terminal #8 relative to base station 10 is small, base station 10 forms beam B1 for terminal #6 to transmit a signal, and simultaneously, forms beam B2 for terminals #7 and #8 to transmit signals. For this reason, there is a risk that the separation performance for terminals #7 and #8 may decrease.

In such a case, base station 10, after having determined the user groups, may request channel information from terminals #6, #7, and #8 belonging to the same user group, and may exclude at least one of terminals #7 and #8 from the user group based on the channel information provided as feedback.

In this case, base station 10 determines the user groups based on the distance information, so that the number of the terminals for which signals are spatially multiplexed can be limited in advance and, thus, the channel information to be provided as feedback by terminals 20 can be reduced. In the example illustrated in FIG. 6, the terminals for which signals are spatially multiplexed can be limited to terminals #6, #7, and #8, and it can be determined that terminals #9 and #10 are not spatially multiplexed. Therefore, it is no longer necessary that the channel information required for spatial multiplexing of terminals #9 and #10 is provided as feedback and, thus, the feedback information can be reduced.

Example 1 of scheduling has been hereinabove described in relation to the case where scheduler 108 obtains the distance information as the position-related information. Next, as Example 2, descriptions will be given in relation to the case where scheduler 108 obtains direction information as the position-related information.

Example 2

Figure 7:
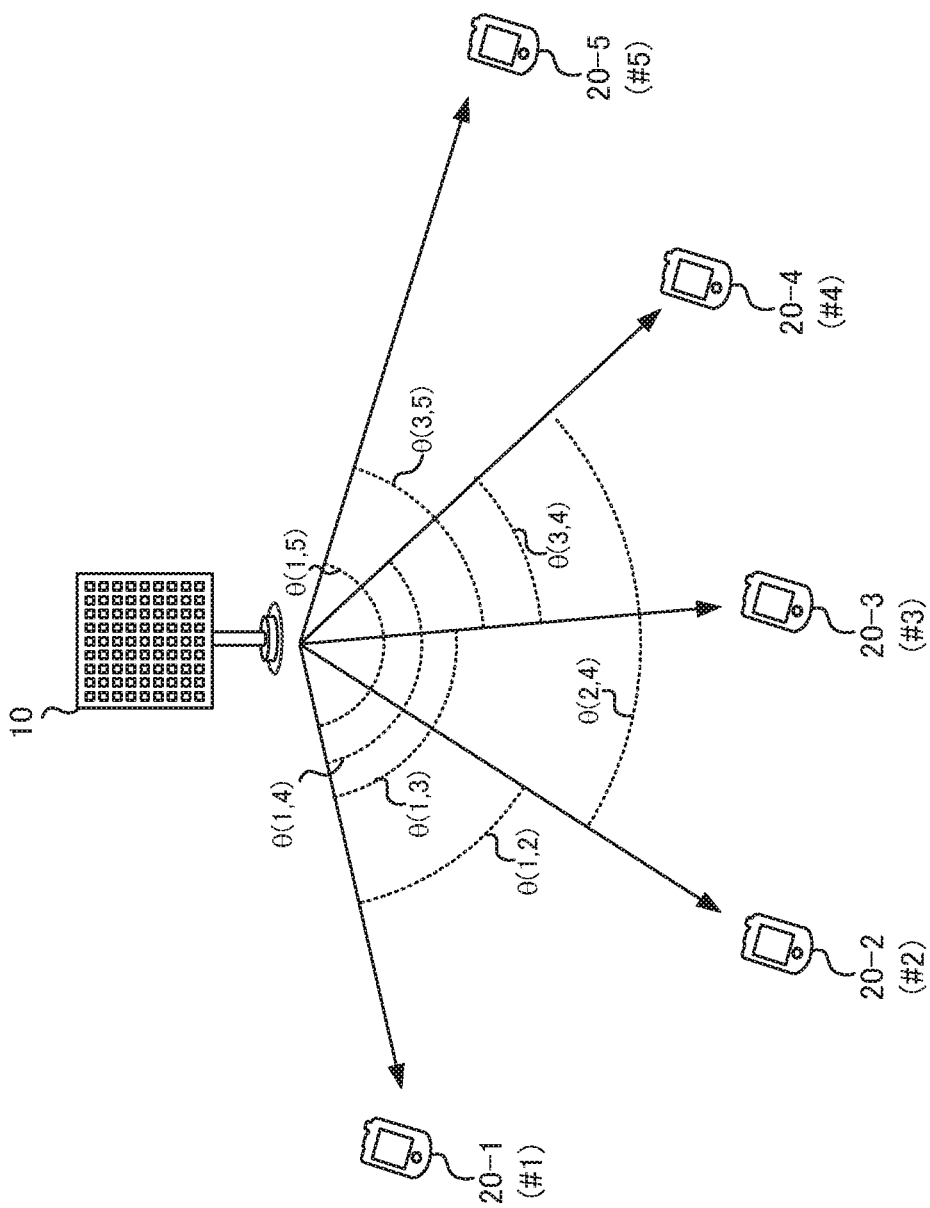
FIG. 7 illustrates Example 2 of the method for determining the user groups.

FIG. 7 illustrates Example 2 of the method for determining the user groups. FIG. 7 illustrates the determining method in a case where scheduler 108 obtains the direction information from position-related-information obtaining section 107. FIG. 7 illustrates base station 10 and five terminals 20 (terminals 20-1 to 20-5). Note that, terminals 20-1 to 20-5 are hereinafter appropriately referred to as terminals #1 to #5, as in FIG. 3.

FIG. 7 shows angular difference θ (1, 2) between terminal #1 and terminal #2 relative to base station 10. Similarly, FIG. 7 shows angular difference θ (i, j) between terminal #i and terminal #j relative to base station 10, where i and j are an integer between 1 and 5, inclusive, and are different from each other.

Scheduler 108 obtains the direction information indicating directions in which terminals 20 exist relative to base station 10, and computes angular difference θ between terminals (i, j). For example, when the information direction is information indicating the best beams for respective terminals 20, scheduler 108 determines that the directions of the best beams are the directions in which terminals 20 exist, and computes angular difference θ (i, j) between terminals.

Note that, the terminal providing feedback of the direction information serving as the position-related information is not particularly limited. For example, the direction information indicating the direction in which terminal #i exists relative to base station 10 (hereinafter referred to as "direction information #i") may be provided by terminal #i. Alternatively, terminal #i may notify terminal #j of direction information #i. In this case, terminal #j provides base station 10 collectively with the feedback of the direction information indicating the direction in which terminal #j exists relative to base station 10, and direction information #i of which terminal #j has been notified. Note, in this case, that terminal #j may receive notification of multiple pieces of direction information from two or more terminals, and may provide base station 10 collectively with the feedback of the direction information estimated by terminal #j and the multiple pieces of direction information of which terminal #j has been notified.

Note also that, each terminal may provide the feedback of the direction information and other position-related information collectively. For example, each of the terminals may provide base station 10 collectively with the feedback of the distance information and direction information described above. By way of example of distance information to be provided as feedback, terminal #i may estimate distance d (j, k) between terminal #j and terminal #k, which is the relative distance (see FIG. 3). In this case, terminal #i may provide base station 10 with the information on distance d (j, k) as feedback, or may notify another terminal (for example, terminal #j) of such information. Terminal #i, when providing base station 10 with the information on distance d 0, k) as feedback, may provide base station 10 collectively with the information on distance d (j, k) and the direction information (for example, the direction information estimated by terminal #i and/or one or more pieces of direction information of which terminal #i has been notified) as feedback.

For example, in the case of Line-of-Sight (LOS), the best beams indicate the directions of terminals 20 relative to base station 10, and therefore, the best beams used as direction information are effective as feedback information.

When the position-related information is direction information, scheduler 108 determines that terminals 20 for which the computed angular differences between one terminal and another are each equal to or greater than a threshold are terminals 20 belonging to the same user group. The threshold with which the angular differences between terminals are compared is set, for example, based on the angular difference allowing the orthogonality of the beams formed by base station 10 to be ensured.

By way of example, a method for determining whether or not other terminals (terminals #2 to #5) belong to the same user group as terminal #1 (hereinafter referred to as "user group A") is described with reference to FIG. 7.

Scheduler 108 compares angular difference θ (1, 2) between terminal #1 and terminal #2 with the threshold. In the example of FIG. 7, angular difference θ (1, 2) is less than the threshold and, accordingly, scheduler 108 determines that terminal #2 does not belong to user group A.

Next, scheduler 108 compares angular difference θ (1, 3) between terminal #1 and terminal #3 with the threshold. In the example of FIG. 7, angular difference d (1, 3) is equal to or greater than the threshold and, accordingly, scheduler 108 determines that terminal #3 belongs to user group A.

Next, scheduler 108 determines whether or not terminal #4 belongs to user group A.

In this case, since scheduler 108 has already determined that terminals #1 and #3 belong to user group A, scheduler 108 compares angular difference θ (1, 4) between terminal #1 and terminal #4 with the threshold and compares angular difference θ (3, 4) between terminal #3 and terminal #4 with the threshold. In the example of FIG. 7, although angular difference θ (1, 4) between terminal #1 and terminal #4 is equal to or greater than the threshold, angular difference θ (3, 4) between terminal #3 and terminal #4 is less than the threshold. In this case, scheduler 108 determines that terminal #4 does not belong to user group A.

Next, scheduler 108 determines whether or not terminal #5 belongs to user group A.

As with the case of terminal #4, since scheduler 108 has already determined that terminals #1 and #3 belong to user group A, scheduler 108 compares angular difference θ (1, 5) between terminal #1 and terminal #5 with the threshold and compares angular difference θ (3, 5) between terminal #3 and terminal #5 with the threshold. In the example of FIG. 7, angular difference θ (1, 5) between terminal #1 and terminal #5 is equal to or greater than the threshold, and angular difference θ (3, 5) between terminal #3 and terminal #5 is equal to or greater than the threshold. In this case, scheduler 108 determines that terminal #5 belongs to user group A.

Similarly, scheduler 108 determines that terminals #2 and #4 are of the same user group (hereinafter referred to as "user group B").

As described above, when the position-related information is direction information, scheduler 108 determines that terminals 20 for which the angular differences between one terminal and another are each equal to or greater than a threshold are terminals 20 belonging to the same user group.

Note that, although the above description is given in relation to the example where five terminals are divided into two user groups, the number of user groups and the number of terminals included in each user group are not limited. For example, scheduler 108 may change the user groups based on the number of terminals which can be included in one user group (for example, the number of signals that can be spatially multiplexed), the size of time-frequency resources which can be assigned, and/or the like. For example, when the number of terminals which can be included in each user group is two and the time-frequency resources can be assigned to three user groups, scheduler 108 may group terminals #1 and #4 into one user group, terminals #2 and #5 into another user group, and terminal #3 into still another user group.

Note also that, although the descriptions with reference to FIG. 7 are given in relation to the terminals existing in a plane, the user groups may be determined based on position-related information indicating three-dimensional positional relationships including the height direction with respect to the plane.

For example, when base station 10 forms beams both in the horizontal direction (for example, the azimuth-angle directions of the beams) and in the vertical direction (for example, the elevation-angle directions of the beams), that is, when beams are formed not only in one direction but in two mutually-perpendicular directions, the user groups may be determined based on angular differences along each of the two directions.

For example, when the angular difference between terminal #1 and terminal #3 in the horizontal direction is equal to or greater than $\alpha$ ($\alpha$ is a real number greater than zero) or the angular difference between terminal #1 and terminal #3 in the vertical direction is equal to or greater than $\beta$ ($\beta$ is a real number greater than zero), terminals #1 and #3 may be determined to be terminals belonging to the same user group.

In this case, $\alpha$ and $\beta$ may be different from each other. For example, the value of a is set based on the angular difference allowing the orthogonality of the beams formed by base station 10 in the horizontal directions to be ensured, and the value of p is set based on the angular difference allowing the orthogonality of the beams formed by base station 10 in the vertical directions to be ensured.

Scheduler 108 assigns time-frequency resources to terminals 20 grouped into the determined user groups. Resource assignment is the same as that illustrated in FIG. 4 and, thus, detailed descriptions thereof are omitted.

<Processing by Base Station in Example 2>

Figure 8:
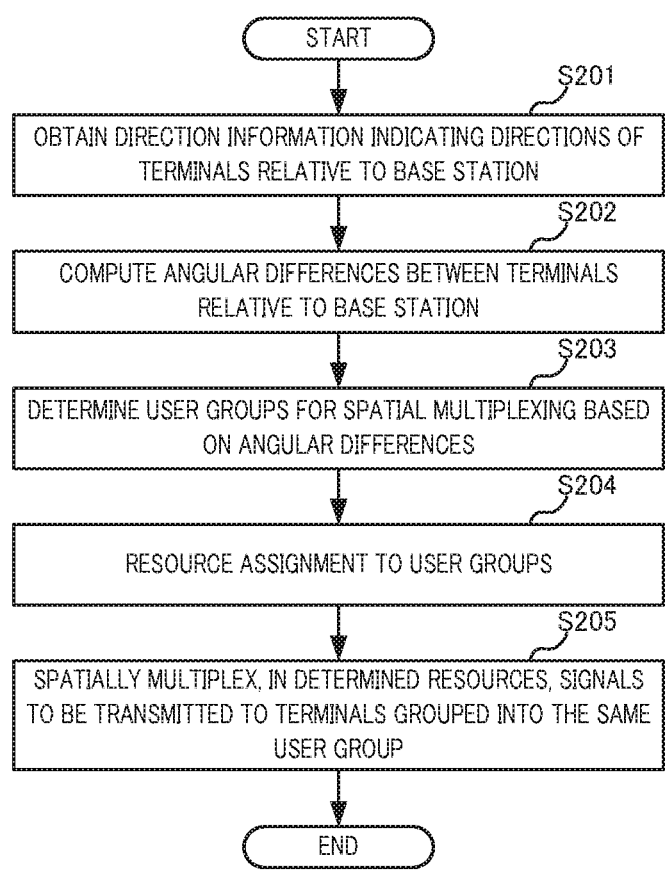
FIG. 8 is a flowchart illustrating Example 2 of the processing performed by the base station in Embodiment 1.

Next, Example 2 of processing by base station 10 in Embodiment 1 of the present invention is described with reference to FIG. 8. FIG. 8 is a flowchart illustrating Example 2 of the processing performed by base station 10 in Embodiment 1 of the present invention.

At step S201, base station 10 obtains from terminals 20, the direction information indicating the directions of terminals 20 relative to base station 10 as the position-related information.

At step S202, base station 10 computes the angular differences between terminals relative to base station 10 based on the direction information.

At step S203, base station 10 determines the user groups for spatial multiplexing based on the computed angular differences.

At step S204, base station 10 assigns time-frequency resources to the determined user groups. Specifically, base station 10 assigns the same time-frequency resources respectively to the same user groups of terminals 20, and assigns time-frequency resources mutually different in at least one of the time and frequency domains respectively to mutually-different user groups of terminals 20.

At step S205, base station 10 spatially multiplexes in the determined time-frequency resources, the signals to be transmitted to the same user groups of terminals 20, and carries out the transmission processing of the signals. Then, the flow ends.

Note that, although the above descriptions of Example 1 of the scheduling have been given in relation to the case where scheduler 108 obtains the distance information as position-related information and the above descriptions of Example 2 have been given in relation to the case where scheduler 108 obtains the direction information as position-related information, these examples may be combined. For example, when scheduler 108 obtains the distance information and direction information from position-related-information obtaining section 107 as position-related information, the method for determining the user groups as described in Example 1 and the method for determining the user groups as described in Example 2 may be combined.

Next, as Example 3, descriptions will be given in relation to the case where scheduler 108 obtains position information as position-related information.

Example 3

When scheduler 108 obtains the position information on terminals 20 from position-related-information obtaining section 107, scheduler 108 can compute the distances between terminals and the angular differences between terminals based on the position information. Accordingly, scheduler 108 may combine above-mentioned Examples 1 and 2 to determine the user groups.

Additionally, when the position information refers to positions in the three-dimensional space (for example, the X, Y, and Z coordinates of the space defined by the X, Y, and Z axes perpendicular to one another), scheduler 108 can compute the distances between terminals along each of the horizontal direction (for example, the azimuth-angle directions of the beams) and the vertical direction (for example, the elevation-angle directions of the beams) and can also compute the angular differences between terminals along each of the horizontal and vertical directions. Therefore, scheduler 108 may determine the user groups based on whether or not one or more of following four conditions are satisfied: the distance between terminals along the horizontal direction is equal to or greater than X; the distance between terminals along the vertical direction is equal to or greater than Y; the angular difference between terminals along the horizontal direction is equal to or greater than $\alpha$; and the angular difference between terminals along the vertical direction is equal to or greater than $\beta$.

Note that, the terminal providing feedback of the position information serving as the position-related information is not particularly limited. For example, terminal #m (m is an integer equal to or greater than one) may provide base station 10 with the position information on terminal #m estimated by terminal #m, or may notify terminal #n (n is an integer equal to or greater than one, and different from m) of such position information. When notifying terminal #n of the position information, terminal #n provides base station collectively with feedback of the position information on terminal #n estimated by terminal #n and the position information on terminal #m of which terminal #n has been notified. Note, in this case, that terminal #n may receive notification of multiple pieces of position information from two or more terminals, and may provide base station 10 collectively with the feedback of the position information estimated by terminal #n and the multiple pieces of position information of which terminal #n has been notified.

Note also that, each terminal may provide the feedback of the position information and other position-related information collectively. For example, each of the terminals may provide base station 10 collectively with the feedback of the distance information and position information as described above. By way of example of distance information to be provided as feedback, terminal #i may estimate distance d (j, k) between terminal #j and terminal #k, which is the relative distance (see FIG. 3). In this case, terminal #i may provide base station 10 with the information on distance d (j, k) as feedback, or may notify another terminal (for example, terminal #j) of such information. Terminal #i, when providing base station 10 with the information on distance d (j, k) as feedback, may provide base station 10 collectively with the information on distance d (j, k) and the position information (for example, the position information estimated by terminal #i and/or one or more pieces of position information of which terminal #i has been notified) as feedback.

<Processing by Base Station in Example 3>

Figure 9:
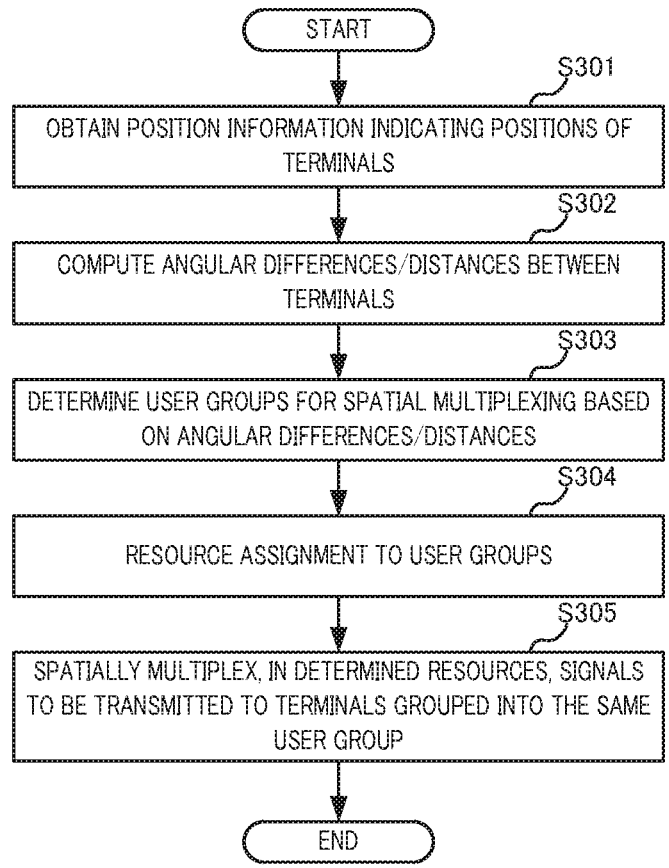
FIG. 9 is a flowchart illustrating Example 3 of the processing performed by the base station in Embodiment 1.

Next, Example 3 of processing by base station 10 in Embodiment 1 of the present invention is described with reference to FIG. 9. FIG. 9 is a flowchart illustrating Example 3 of the processing performed by base station 10 in Embodiment 1 of the present invention.

At step S301, base station 10 obtains from terminals 20, the position information indicating the positions of terminals 20 as the position-related information.

At step S302, base station 10 computes the distances between terminals and/or the angular differences between terminals relative to base station 10 based on the position information. Note that, the angular differences to be computed may be angular differences between terminals along each of the horizontal direction and the vertical direction. Note also that, the distances to be computed may be distances between terminals along each of the horizontal direction and the vertical direction. Alternatively, the angular differences along the horizontal and vertical directions and the distances along the horizontal and vertical directions may also be combined.

At step S303, base station 10 determines the user groups for spatial multiplexing based on the computed angular differences and/or distances.

At step S304, base station 10 assigns time-frequency resources to the determined user groups. Specifically, base station 10 assigns the same time-frequency resources respectively to the same user groups of terminals 20, and assigns time-frequency resources mutually different in at least one of the time and frequency domains respectively to mutually-different user groups of terminals 20.

At step S305, base station 10 spatially multiplexes in the determined time-frequency resources, the signals to be transmitted to the same user groups of terminals, and carries out the transmission processing of the signals. Then, the flow ends.

<Effect>

As described above, in Embodiment 1 of the present invention, base station 10 determines the user groups of terminals 20 based on the position-related information, and spatially multiplexes the signals to be transmitted to the same user groups of terminals 20. With this configuration, scheduling is carried out using the position-related information provided by terminals 20 as feedback, so that the amount of feedback information is less than that in the case where the channel information is provided as feedback, and accordingly, it is made possible to carry out effective scheduling of terminals 20.

For example, in 5G frequency selectivity is mitigated more than in the traditional mobile communication systems and, accordingly, utilizing spatial multiplexing makes it possible to achieve high-speed and high-throughput transmission for terminals 20 for which high-speed transmission is required.

For this reason, the necessity for terminals 20 to receive reference signals transmitted by base station 10 and estimate channel information so as to provide feedback for resource assignment, such as CQI feedback and the like, can be reduced, and thus, the control overhead can be significantly reduced.

Note that, although the example in which the user groups of terminals are determined based on the position-related information has been mentioned in Embodiment 1 described above, this example may also be combined with other terminal selection techniques (grouping techniques).

Embodiment 2

Descriptions of Embodiment 2 of the present invention will be given in relation to scheduling in a case where positions (and position-related information) of terminals 20 change with time owing to movement and/or the like of terminals 20.

Note that, since the configurations of the base station and the terminals according to Embodiment 2 of the present invention are similar to base station 10 and terminals 20 in Embodiment 1, detailed descriptions of the base station and terminals according to Embodiment 2 are omitted. In Embodiment 2 of the present invention, operations of position-related-information obtaining section 107 and scheduler 108 in base station 10, and operations of position-related-information estimating section 203 in each of terminals are different from those in Embodiment 1. Hereinafter, differences in operation will be described.

Position-related-information estimating section 203 of each of terminals 20 according to Embodiment 2 of the present invention estimates the position-related information as in Embodiment 1. This estimated position-related information is hereinafter referred to as "current position-related information."

Additionally, position-related-information estimating section 203 estimates moving-path information indicating a moving path when each of terminals 20 is moving. For example, the moving-path information is the velocity vector indicating the speed and direction of movement of each of terminals 20 or, when a user of one of terminals 20 is in a vehicle and the vehicle is moving, the moving-path information is an advancing route of the vehicle. Note that the moving-path information is not limited to the above examples. The moving-path information only have to be information for estimating the position-related information after a predetermined time lapse from the present time, as described below.

Then, position-related-information estimating section 203 estimates the position-related information after the predetermined time lapse from the present time based on the current position-related information and moving-path information. The position-related information after the predetermined time lapse from the present time is hereinafter referred to as "future position-related information."

Position-related-information estimating section 203 provides base station 10 with the estimated current and future position-related information as feedback information. Note that, a method for providing feedback is not particularly limited. Position-related-information estimating section 203 may transmit the signal including the feedback information to base station 10 via communication sections 202, or may provide the feedback using other signaling (higher-layer signaling or the like).

Additionally or alternatively, position-related-information estimating section 203 of one of terminals 20 (hereinafter, this terminal 20 may also be referred to as "first terminal 20") may receive from neighboring terminals 20 around first terminal 20 via communication sections 202, notification of current and future position-related information estimated by said neighboring terminals 20, and may provide base station 10 via communication sections 202 with the feedback information including the current and future position-related information estimated by first terminal 20 and the current and future position-related information of which first terminal 20 has been notified by said neighboring terminals 20.

Additionally or alternatively, position-related-information estimating section 203 of first terminal 20 may notify one of neighboring terminals 20 around first terminal 20 of the estimated current and future position-related information via communication sections 202 instead of providing base station 10 with feedback of the estimated current and future position-related information. In this case, position-related-information estimating section 203 of said neighboring terminal 20 having received the notification provides base station via communication sections 202 of said neighboring terminal 20 with feedback information including the current and future position-related information estimated by said neighboring terminal 20 and the current and future position-related information of which said neighboring terminal 20 have been notified.

Alternatively, position-related-information estimating section 203 of first terminal may estimate, as the current and/or future position-related information, the current and/or future distances (current and/or future relative distances) between two of neighboring terminals 20 existing around first terminal 20. For example, position-related-information estimating section 203 may provide base station 10 with the information on the current and/or future relative distances as feedback information via communication sections 202 or may notify one of neighboring terminals 20 of such information. When base station 10 is to be provided with the feedback, position-related-information estimating section 203 of first terminal 20 may provide base station 10 collectively with the feedback of the current and/or future position-related information estimated by first terminal 20, the current and/or future position-related information of which first terminal 20 has been notified by said neighboring terminals 20, and the information on the current and/or future relative distances estimated by first terminal 20.

Position-related-information obtaining section 107 of base station 10 according to Embodiment 2 of the present invention obtains the current and future position-related information included in the feedback information received from terminals 20. Position-related-information obtaining section 107 outputs the obtained current and future position-related information to scheduler 108.

Scheduler 108 of base station 10 according to Embodiment 2 of the present invention performs scheduling of multiple terminals 20 based on the current and future position-related information. Specifically, scheduler 108 determines groups (user groups) of terminals 20 for which signals are spatially multiplexed, based on the current position-related information in the same manner as in Embodiment 1.

At this time, when at least one of terminals 20 does not belong to any of the user groups (hereinafter, terminal 20 which does not belong to any of the user groups is referred to as "target terminal 20"), scheduler 108 estimates whether or not target terminal 20 can belong to any of the user groups in the future (e.g. after a predetermined time lapse), based on the future position-related information on target terminal 20.

The future position-related information on target terminal 20 is at least one of information indicating the distance between target terminal 20 and another terminal (for example, terminal 20 determined to belong to one of the user groups) after a predetermined time lapse, information indicating the direction in which target terminal 20 exists relative to base station after the predetermined time lapse, and information indicating the position of target terminal 20 after the predetermined time lapse.

In the case where target terminal 20 can belong to one of the user groups in the future, scheduler 108 suspends the resource assignment to the already determined user groups and the processing of spatially multiplexing signals for transmission of the signals until target terminal 20 moves to the position at which target terminal 20 can belong to one of the user groups. Then, after target terminal 20 successfully belongs to one of the user groups (for example, after the predetermined time lapse), scheduler 108 determines the user groups again and performs the resource assignment to the user groups.

In the case where target terminal 20 cannot belong to any of the user groups in the future, scheduler 108 determines that target terminal 20 belongs to a user group different from the already determined user groups. Then, scheduler 108 assigns a time-frequency resource different from the time-frequency resources assigned to the already determined user groups to the user group to which target terminal 20 belongs.

<Concrete Example of Scheduling of Embodiment 2>

Next, the scheduling by scheduler 108 of base station 10 according to Embodiment 2 of the present invention is described. Note that, the below-described example is an example in which scheduler 108 obtains the distance information as the position-related information.

Figure 10:
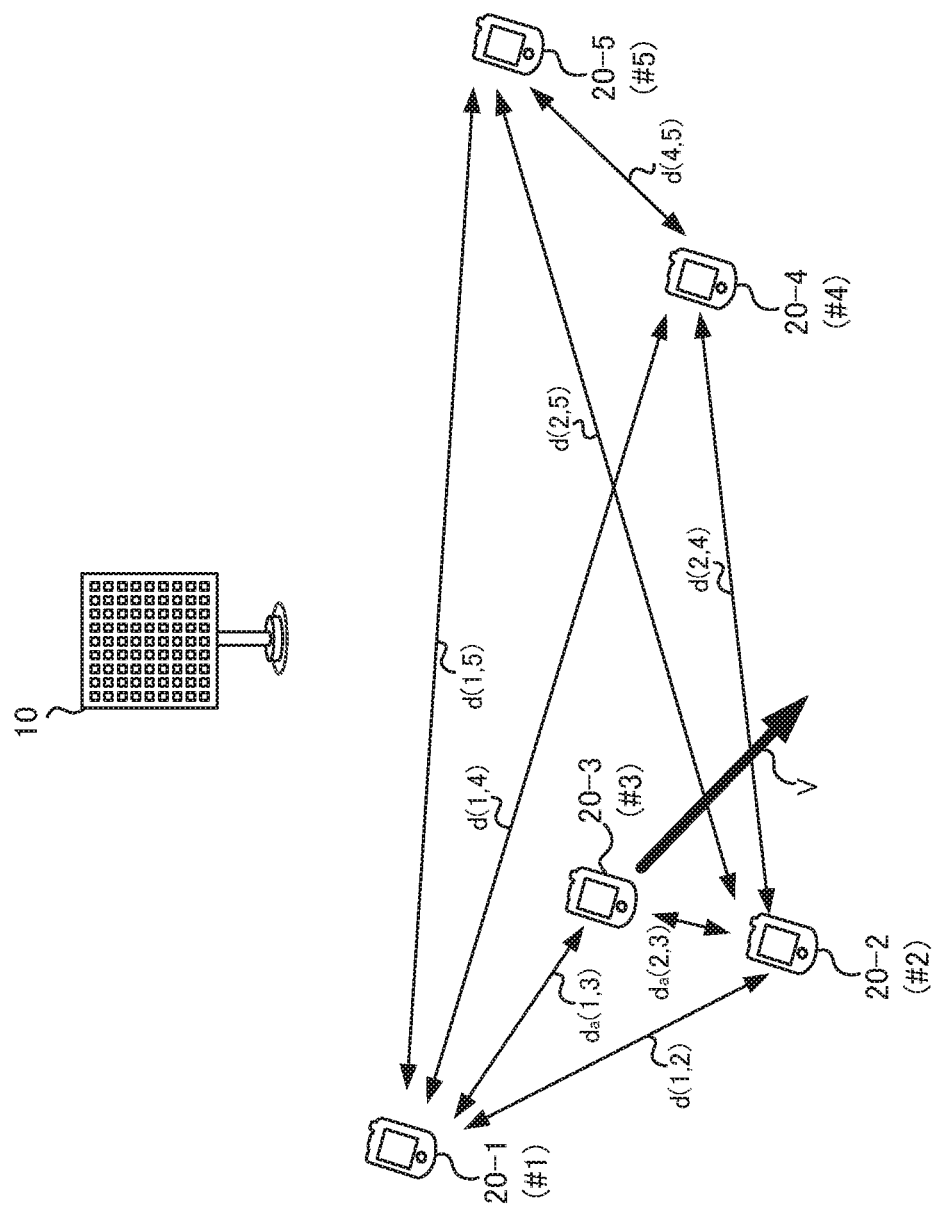
FIG. 10 illustrates an example of the current positions of the terminals.
Figure 11:
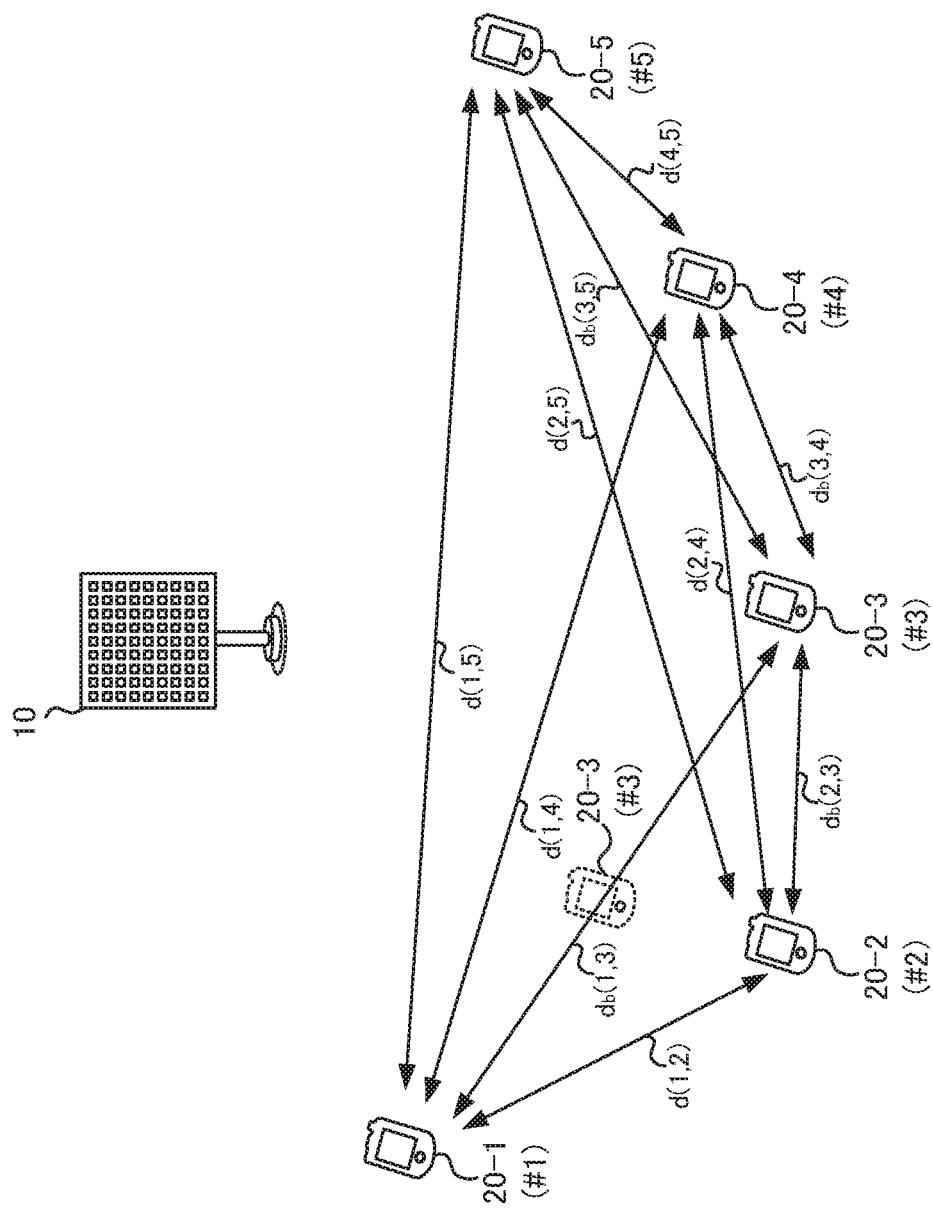
FIG. 11 illustrates an example of the positions of the terminals after a predetermined time lapse.

FIG. 10 illustrates an example of the current positions of the terminals. FIG. 11 illustrates an example of the positions of the terminals after a predetermined time lapse. Note that, similar components in FIGS. 3, 10, and 11 are provided with the same reference numerals and detailed descriptions of such components are omitted.

FIG. 10 shows the distances between the terminals at present as the current position-related information. FIG. 11 shows the distances between the terminals in the future as the future position-related information. FIG. 10 shows that terminal #3 is moving in the direction indicated by velocity vector V. In the example of FIGS. 10 and 11, no terminals other than terminal #3 are moving and, accordingly, the distances between the terminals other than the distance between terminal #3 and other terminals do not change.

When the current position-related information is current distance information, scheduler 108 determines that terminals 20 for which the distances between one terminal and another are each equal to or greater than a threshold are terminals 20 belonging to the same user group.

In the example of FIG. 10, scheduler 108 determines that terminals #1 and #5 are terminals belonging to one user group (hereinafter referred to as "user group E") and terminals #2 and #4 are terminals belonging to another user group different from user group E (hereinafter referred to as "user group F"). Scheduler 108 determines that terminal #3 does not belong to user group E since distance $d_a$ (1, 3) between terminals #1 and #3 at present is less than the threshold. Scheduler 108 also determines that terminal #3 does not belong to user group F since distance $d_a$ (2, 3) between terminals #2 and #3 at present is less than the threshold. That is, terminal #3 is the target terminal in the example of FIG. 10. Hereinafter, terminal #3 is appropriately referred to as target terminal #3.

In this case, scheduler 108 estimates whether or not target terminal #3 can belong to any of the user groups in the future based on the future position-related information on target terminal #3.

Specifically, distance $d_b$ (1, 3), distance $d_b$ (2, 3), distance $d_b$ (3, 4), and distance $d_b$ (3, 5) correspond to the future position-related information on target terminal #3 in the example of FIG. 11. Scheduler 108 estimates whether or not target terminal #3 can belong to any of the user groups in the future based on the future position-related information.

In the example of FIG. 11, because distance $d_b$ (1, 3) is equal to or greater than the threshold and distance $d_b$ (1, 5)

is equal to or greater than the threshold, scheduler 108 estimates that target terminal #3 can belong to user group E in the future.

In this case, scheduler 108 suspends the resource assignment to user groups E and F already determined as illustrated in FIG. 10 and signal transmission, determines the user groups again, for example, after target terminal #3 successfully belongs to user group E after a predetermined time lapse (that is, after the positional relationship as illustrated in FIG. 11 has resulted), and performs the resource assignment to user groups E and F including target terminal #3.

Note that, the future resource assignment (the resource assignment after a predetermined time lapse) is done by the same method as described with reference to FIG. 4, and thus, detailed descriptions of the future resource assignment are omitted.

Note that, although the example illustrated in FIGS. 10 and 11 has been described in relation to the case where the position-related information is the distance information, the position-related information may be direction information or position information. Since cases where the position-related information is the direction information or position information are similar to the case where the position-related information is the distance information, detailed descriptions of the cases of direction information and position information are omitted.

<Processing by Base Station in Scheduling of Embodiment 2>

Figure 12:
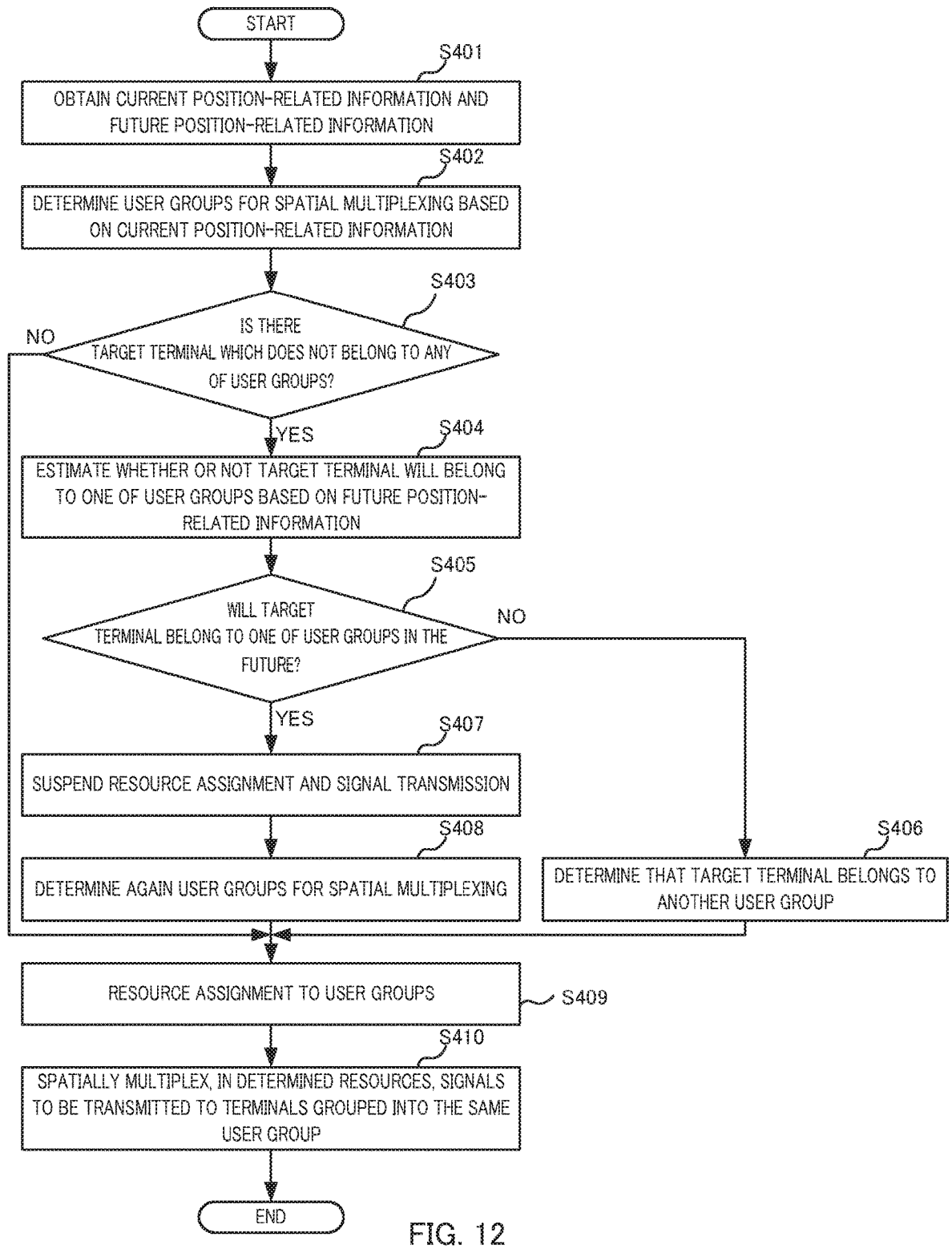
FIG. 12 is a flowchart illustrating an example of processing performed by a base station in Embodiment 2.

Next, processing by base station 10 in Embodiment 2 of the present invention is described with reference to FIG. 12. FIG. 12 is a flowchart illustrating an example of the processing performed by base station 10 in Embodiment 2 of the present invention.

At step S401, base station 10 obtains current and future position-related information from terminals 20.

At step S402, base station 10 determines user groups for spatial multiplexing based on the current position-related information.

At step S403, base station 10 determines whether or not there exists any target terminal which does not belong to any of the determined user groups.

When there exists no target terminal which does not belong to any of the user groups (NO at step S403), the flow proceeds to processing at step S409.

When there exists a target terminal which does not belong to any of the user groups (YES at step S403), base station 10 estimates at step S404 whether or not the target terminal can belong to one of the user groups in the future, based on the future position-related information.

Then, base station 10 determines at step S405 whether or not the target terminal will belong to one of the user groups in the future.

In the case where the target terminal will not belong to any of the user groups in the future (NO at step S405), base station 10 determines that the target terminal belongs to another user group different from the already determined user groups at step S406. Then, the flow proceeds to processing at step S409.

In the case where the target terminal will belong to one of the user groups in the future (YES at step S405), base station 10 suspends resource assignment to the user groups already determined at step S402 and signal transmission until the target terminal moves to the position at which the target terminal belongs to one of the user groups (for example, until a predetermined time elapses) at step S407.

Then, at step S408, base station 10 determines the user groups for spatial multiplexing again based on the future position-related information. Then, the flow proceeds to processing at step S409.

At step S409, base station 10 assigns time-frequency resources to the user groups. Specifically, base station 10 assigns the same time-frequency resources respectively to the same user groups of terminals 20, and assigns time-frequency resources mutually different in at least one of the time and frequency domains respectively to mutually-different user groups of terminals 20.

At step S410, base station 10 spatially multiplexes in the determined time-frequency resources, the signals to be transmitted to the same user groups of terminals 20, and carries out the transmission processing of the signals. Then, the flow ends.

Note that, although the above example has been described in relation to the case where at step S408, base station 10 determines the user groups for spatial multiplexing again based on the future position-related information, the present invention is not limited to this example. For example, at step S407, after the suspension of the signal transmission has finished (for example, after a predetermined time elapsed), base station 10 may request the position-related information from terminals 20 and may determine the user groups again based on the position-related information obtained again from terminals 20.

<Effect>

As described above, in Embodiment 2 of the present invention, base station 10 determines the user groups of terminals 20 based on the current position-related information, and, when at least one of terminals 20 does not belong to any of the user groups (when there is any target terminal), estimates whether or not the target terminal will belong to one of the user groups in the future, based on the future position-related information. Then, in the case where the target terminal can belong to one of the user groups in the future, base station 10 suspends the resource assignment to the user groups and signal transmission, and then carries out the processing of spatially multiplexing signals for transmission of the signals after the target terminal has come to the state where the target terminal can belong to one of the user groups.

With this configuration, it is made possible to avoid the situation where time-frequency resources to be assigned run short due to a temporary increase in number of user groups, and thus, to ensure the fairness of transmission rates and transmission opportunities between terminals. The frequency utilization efficiency can be increased consequently.

Note that, although the example in which the user groups of terminals 20 are determined based on the position-related information has been mentioned in Embodiment 2 described above, this example may also be combined with other techniques of selecting terminals 20 (grouping techniques).

Note also that, although the example in which terminals 20 estimate the future position-related information has been mentioned in Embodiment 2 described above, the present invention is not limited to this example. For example, base station 10 may estimate the future position-related information based on the moving-path information and the current position-related information with which base station 10 is provided from terminals 20.

Alternatively, base station 10 may suspend the signal transmission when base station 10 recognizes, based on the moving-path information, that the target terminal which does not belong to any of the user groups is moving. In this case, base station 10 may obtain the position-related information again from the target terminal after a predetermined time lapse to determine the user groups again based on the position-related information obtained again.

Note that, although the example in which terminals 20 estimate the position-related information and provide base station 10 with the position-related information has been mentioned in the above-described embodiments, base station 10 may also estimate the position-related information on terminals 20. For example, terminals 20 may transmit uplink signals (for example, uplink reference signals) to base station 10, and base station 10 may estimate the position-related information using the uplink signals received from terminals 20. Base station 10 may determine the user groups of terminals based on the position-related information estimated by base station 10 or based on the position-related information estimated by base station 10 and the position-related information with which base station 10 is provided from terminal 20.

Note also that, although the above-mentioned embodiments have been described in relation to the example where the distance between each two of terminals 20 is used as the distance information, the present invention is not limited to this example. For example, the distances between base station 10 and terminals 20 may also be used as the distance information.

The embodiments of the invention have been described above.

(Hardware Configuration)

Note that the block diagrams used to describe the embodiments illustrate blocks on the basis of functions. These functional blocks (constituent sections) are implemented by any combination of hardware and/or software. A means for implementing the functional blocks is not particularly limited. That is, the functional blocks may be implemented by one physically and/or logically coupled apparatus. Two or more physically and/or logically separated apparatuses may be directly and/or indirectly (for example, via wires and/or wirelessly) connected, and the plurality of apparatuses may implement the functional blocks.

Figure 13:
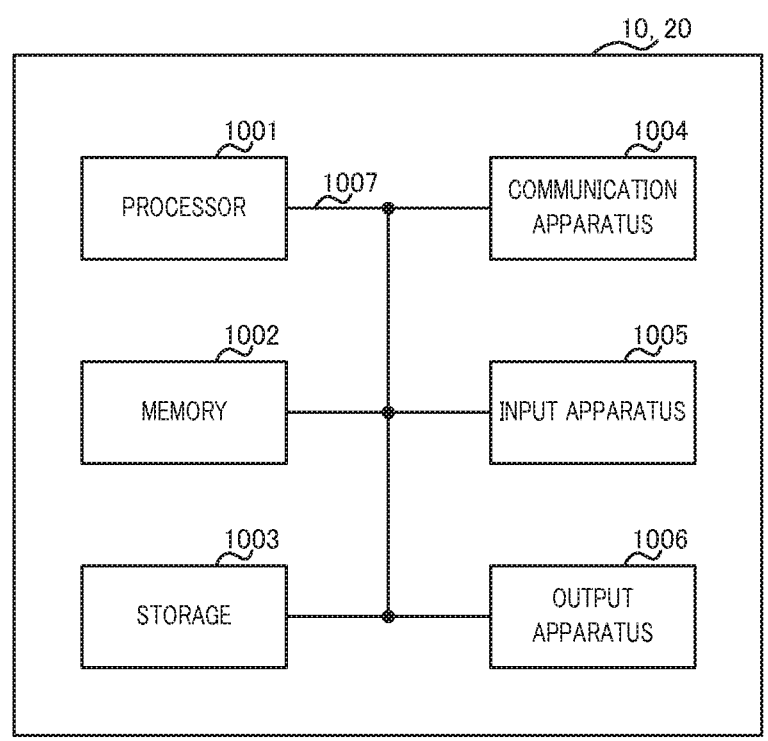
FIG. 13 illustrates an exemplary hardware configuration of the base station and the terminal according to the present invention.

For example, base station 10, terminal 20, and the like according to an embodiment of the present invention may function as a computer that executes processing of a radio communication method of the present invention. FIG. 13 illustrates an example of a hardware configuration of the base station and the terminal according to an embodiment of the present invention. Physically, base station 10 and terminal 20 as described above may be a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of base station 10 and of terminal 20 may include one apparatus or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in base station 10 and terminal 20 are implemented by predetermined software (program) loaded into hardware, such as processor 1001, memory 1002, and the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, transmission-signal generating section 101, precoding section 102, weight selecting section 103, beamforming section 104, communication section 105, position-related-information obtaining section 107, scheduler 108, communication section 202, position-related-information estimating section 203, postcoding section 204, reception-signal processing section 205, and the like as described above may be implemented by processor 1001.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, at least part of the functional blocks constituting base station 10 and terminal 20 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, communication section 105, antenna 106, antenna 201, communication section 201, and the like as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, base station 10 and terminal 20 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented by at least one of these pieces of hardware.

(Notification and Signaling of Information)

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

(Adaptive System)

The aspects and embodiments described in the present specification may be applied to a system using LTE (Long Term Evolution), LTE-A (LTE-Advanced), SUPER 3; IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

(Processing Procedure and the Like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the Like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

("System" and "Network")

The terms "system" and "network" used in the present specification can be interchangeably used.

(Names of Parameters and Channels)

The information, the parameters, and the like described in the present specification may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station", "eNB", "cell", and "sector" can be interchangeably used in the present specification. The base station may be called a fixed station, a NodeB, an eNodeB (eNB), an access point, a femto cell, a small cell, or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

As used herein, the term "determining" may encompass a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard. The correction RS may be called a TRS (Tracking RS), a PC-RS (Phase Compensation RS), a PTRS (Phase Tracking RS), or an additional RS. The demodulation RS and the correction RS may be called by other corresponding names, respectively. The demodulation RS and the correction RS may be specified by the same name (for example, demodulation RS).

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, or the like) in the time domain.

The radio frame, the subframe, the slot, the mini slot, and the symbol indicate time units in transmitting signals. The radio frame, the subframe, the slot, the mini slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval), or one mini slot may be called a TI.

For example, one subframe, a plurality of continuous subframes, or one slot may be called a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one mini slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame is illustrative only, and the number of subframes included in the radio frame, the number of slots included in the subframe, the number of mini slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and the Like of Aspects)

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

The present patent application claims the benefit of priority based on Japanese Patent Application No. 2017-090483 filed on Apr. 28, 2017, and the entire content of Japanese Patent Application No. 2017-090483 is hereby incorporated by reference.

INDUSTRIAL APPLICABILITY

The present invention is useful for wireless communication between a radio base station and a user terminal.

REFERENCE SIGNS LIST

10 Base Station
20 Terminal
101 Transmission-signal Generating Section
102 Precoding Section
103 Weight Selecting Section
104 Beamforming Section
105, 202 Communication Section
106, 201 Antenna
107 Position-related-information Obtaining Section
108 Scheduler
109 Feedback-information Processing Section
203 Position-related-information Estimating Section
204 Postcoding Section
205 Reception-signal Processing Section
1001 Processor
1002 Memory
1003 Storage
1004 Communication Apparatus
1005 Input Apparatus
1006 Output Apparatus
1007 Bus

The invention claimed is:

1. A radio base station, comprising:
a receiver configured to obtain position-related information indicating a positional relationship among a plurality of terminals; and
a processor configured to determine a user group of some or all of the plurality of terminals to be spatially multiplexed in the same time and frequency resource based on the position-related information, wherein
the receiver obtains further position-related information on the plurality of terminals, the further position-related information being the position-related information after a predetermined time, the further position-related information being estimated based on moving paths of the plurality of terminals,
when at least one of the plurality of terminals does not belong to the user group, the processor estimates whether or not the at least one terminal which does not belong to the user group is to belong to the user group after lapse of the predetermined time, based on the further position-related information that is the position-related information after the predetermined time, and
when the at least one terminal which does not belong to the user group is to belong to the user group after the lapse of the predetermined time, the processor determines the user group after the lapse of the predetermined time.

2. The radio base station according to claim 1, wherein the position-related information indicates a distance among the plurality of terminals, and
the processor groups into one group, some or all of the plurality of terminals for which the distance is equal to or greater than a threshold.

3. The radio base station according to claim 2, wherein the processor groups into one user group, some or all of the plurality of terminals for which a horizontal component of the distance is equal to or greater than X or a vertical component of the distance is equal to or greater than Y, where X and Y are positive real numbers.

4. The radio base station according to claim 1, wherein the position-related information indicates a direction of each one of the plurality of terminals relative to the radio base station, and
the processor computes an angular difference among the plurality of terminals based on the directions of the plurality of terminals, and groups into one user group, some or all of the plurality of terminals for which the angular difference is equal to or greater than a threshold.

5. The radio base station according to claim 4, wherein the processor groups into one user group, some or all of the plurality of terminals for which a horizontal component of the angular difference is equal to or greater than $\alpha$ or a vertical component of the angular difference is equal to or greater than $\beta$, where $\alpha$ and $\beta$ are positive real numbers.

6. A terminal configured to perform radio communication with the radio base station according to claim 1, the terminal comprising:
a second processor configured to estimate first position-related information indicating a positional relationship of the terminal; and
a transceiver configured to obtain second position-related information indicating a positional relationship of another terminal different from the terminal, the second position-related information being estimated by the other terminal, wherein
the transceiver provides the radio base station with the first position-related information and the second position-related information as feedback.

7. A terminal configured to perform radio communication with the radio base station according to claim 2, the terminal comprising:
a second processor configured to estimate first position-related information indicating a positional relationship of the terminal; and
a transceiver configured to obtain second position-related information indicating a positional relationship of another terminal different from the terminal, the second position-related information being estimated by the other terminal, wherein
the transceiver provides the radio base station with the first position-related information and the second position-related information as feedback.

8. A terminal configured to perform radio communication with the radio base station according to claim 3, the terminal comprising:
- a second processor configured to estimate first position-related information indicating a positional relationship of the terminal; and
- a transceiver configured to obtain second position-related information indicating a positional relationship of another terminal different from the terminal, the second position-related information being estimated by the other terminal, wherein
- the transceiver provides the radio base station with the first position-related information and the second position-related information as feedback.

9. A terminal configured to perform radio communication with the radio base station according to claim 4, the terminal comprising:
- a second processor configured to estimate first position-related information indicating a positional relationship of the terminal; and
- a transceiver configured to obtain second position-related information indicating a positional relationship of another terminal different from the terminal, the second position-related information being estimated by the other terminal, wherein
- the transceiver provides the radio base station with the first position-related information and the second position-related information as feedback.

10. A terminal configured to perform radio communication with the radio base station according to claim 5, the terminal comprising:
- a second processor configured to estimate first position-related information indicating a positional relationship of the terminal; and
- a transceiver configured to obtain second position-related information indicating a positional relationship of another terminal different from the terminal, the second position-related information being estimated by the other terminal, wherein
- the transceiver provides the radio base station with the first position-related information and the second position-related information as feedback.

* * * * *